United States Patent [19]

Lynch et al.

[11] Patent Number: 5,139,002
[45] Date of Patent: Aug. 18, 1992

[54] SPECIAL PURPOSE BLENDS OF HYDROGEN AND NATURAL GAS

[75] Inventors: Frank E. Lynch, Conifer; Roger W. Marmaro, Morrison, both of Colo.

[73] Assignee: Hydrogen Consultants, Inc., Littleton, Colo.

[21] Appl. No.: 607,133

[22] Filed: Oct. 30, 1990

[51] Int. Cl.[5] ............................................. F02B 13/00
[52] U.S. Cl. .............................. 123/575; 123/27 GE; 123/DIG. 12
[58] Field of Search .................. 123/575, 1 R, 1 D, 2, 123/3, DIG. 12, 525, 526, 27 GE

[56] References Cited

U.S. PATENT DOCUMENTS

| | | | |
|---|---|---|---|
| 1,112,188 | 9/1914 | Atwood | 123/DIG. 12 |
| 1,379,077 | 5/1921 | Blumenberg, Jr. | 123/DIG. 12 |
| 2,140,254 | 12/1938 | Zavka | |
| 2,708,922 | 5/1955 | Neely | |
| 2,866,693 | 12/1958 | Allen | |
| 3,682,142 | 8/1972 | Newkirk | 123/DIG. 12 |
| 3,906,913 | 9/1975 | Rupe | 123/DIG. 12 |
| 4,017,268 | 4/1977 | Gilley | |
| 4,372,753 | 2/1983 | Narasimhan, Jr. et al. | |
| 4,520,763 | 6/1985 | Lynch et al. | |
| 4,531,497 | 7/1985 | Smith | 123/525 |
| 4,535,728 | 8/1985 | Batchelor | 123/27 GE |
| 4,567,857 | 2/1986 | Houseman et al. | 123/DIG. 12 |
| 4,573,435 | 3/1986 | Shelton | |
| 4,831,993 | 5/1989 | Kelgard | 123/575 |
| 4,865,001 | 9/1989 | Jensen | 123/525 |
| 4,876,988 | 10/1989 | Paul et al. | |

OTHER PUBLICATIONS

Eccleston and Fleming. "Technical Progress Report 48," U.S. Bureau of Mines Automotive Exhaust Emissions Program, Feb. 1972.
National Fire Protection Association Regulation #50A, "Gaseous Hydrogen Systems at Consumer Sites". no date provided.
National Institute for Standards and Technology, Technical Note 617. no date provided.
National Fire Protection Association Regulation #52, "Compressed Natural Gas (CNG) Vehicular Fuel Systems". no date provided.
California Energy Commisson Staff Report, AB 234 Report (Draft), "Cost and Availability of Low Emission Motor Vehicles and Fuels," Apr. 1989.
F. E. Lynch and G. J. Egan, "Near Term Introduction of Clean Hydrogen Vehicles Via H2-CNG Blends", presented at the Fourth Canadian Hydrogen Workshop, Toronto, Canada, Nov. 1 & 2, 1989.

*Primary Examiner*—Raymond A. Nelli
*Attorney, Agent, or Firm*—James R. Young

[57] ABSTRACT

A fuel comprising natural gas modified by the addition of hydrogen in appropriate proportions to produce a mixture with a burn rate that matches the burn rate of the gasoline is provided for burning in a gasoline engine without the need for modifications in engine timing, combustion chamber geometry, or other engine design parameters. A mixture of natural gas and nitrogen is also used to increase the knock limit on the power curve of fumigated diesel (compression ignition) engines and to increase the lean burn limit in spark ignition engines.

3 Claims, 1 Drawing Sheet

1

SPECIAL PURPOSE BLENDS OF HYDROGEN AND NATURAL GAS

BACKGROUND OF THE INVENTION

1. Field of the Invention

The present invention relates to alternative fuels for internal combustion engines, and more specifically to blends of hydrogen in natural gas that are specially formulated to achieve specific advantages over pure natural gas or more tradition gasoline or diesel fuels.

2. Description of the Prior Art

The current predominant forms of fuel for internal combustion engines are derivatives of petroleum, namely gasoline and diesel fuel. However, the advancing depletion and unreliability of crude oil resources and significant environmental concerns resulting from the use of these fuels underscore the need for petroleum-independent alternative fuels. Primary U.S. alternative energy resources are reserves of natural gas and coal. Natural gas can be used directly as an alternative fuel for internal combustion engines, or it can be converted into other fuels, including hydrogen gas and liquid fuels, such as methanol (methyl alcohol). Coal is difficult to use directly as a fuel in internal combustion engines, although it can be converted to "coal gas" comprising primarily hydrogen and carbon monoxide or into liquid fuels, including methanol and synthetic petroleum.

Hydrogen, theoretically if not yet practically, is an attractive alternative for meeting future transportation energy requirements with renewable energy sources. Like electricity, hydrogen is an energy carrier, not a source of energy. Traditionally, hydrogen has been manufactured from natural gas or coal, although it is also produced by an electrical water-splitting process known as electrolysis that can be powered by any form of energy. Producing hydrogen as a transportation fuel from nonrenewable energy forms would improve urban air quality, but it would not solve resource problems. However, if hydrogen is derived from renewable energy sources, such as solar energy, wind energy, geothermal energy or ocean thermal energy, it can provide the basis for a perfectly balanced energy cycle:

(1) Electrolysis separates water, $H_2O$, into hydrogen and oxygen gases, $H_2$ and $O_2$ respectively according to the reaction $2H_2O \rightarrow 2H_2+O_2$. The oxygen may be vented or sold as a byproduct.

(2) Hydrogen is stored, transported, delivered to motor vehicles and burned to produce energy for powering the vehicles and water vapor as a by-product according to the net reaction $2H_2+O_2 \rightarrow 2H_2O$.

(3) The water vapor is released to the atmosphere where it eventually falls as precipitation, once again becoming available for electrolysis.

Hydrogen combustion produces no objectionable emissions other than trace amounts of nitrogen oxides that form when residual nitrogen and oxygen in air are heated in the combustion process. Even though prototype hydrogen vehicles have already passed the most strict standards for nitrogen oxide emissions, future hydrogen powered fuel cells may eventually propel motor vehicles with absolutely no nitrogen oxides at all.

Unfortunately, as wonderful as the hydrogen energy cycle may seem in theory, there are several practical drawbacks to the use of hydrogen that have impeded the implementation of hydrogen as a transportation fuel on any significant scale in the past and will continue to do so in the immediate future. Such drawbacks include the greater cost of hydrogen relative to conventional fuels, the difficulty and expense of storing hydrogen, which results in limited driving range, reduced power and operational problems when burned in engines designed for gasoline or diesel fuel, and the lack of a fuel distribution infrastructure. There is also an undeserved perception, sometimes dubbed the Hindenburg Syndrome, that hydrogen is significantly more dangerous than conventional fuels.

To overcome these difficulties and yet take advantage of the burning characteristics of hydrogen, there have been many studies and developments directed to the use of hydrogen in conjunction with conventional liquid petroleum fuels in internal combustion engines. Examples of these developments are disclosed or suggested by U.S. Pat. No. 1,112,188, issued to Atwood on Sept. 29, 1914; U.S. Pat. No. 1,379,077, issued to Blumenberg on May 24, 1921; U.S. Pat. No. 3,906,913 issued to Rupe on Sept. 23, 1975; U.S. Pat. No. 4,017,268, issued to Gilley on Apr. 12, 1977 and U.S. Pat. No. 4,573,435, issued to Shelton on Mar. 4, 1986. In the earlier of these patents, hydrogen was selected because of its effect as a combustion stimulant. In the more recent patents, hydrogen was selected because it is a cleaner burning fuel itself and because it reduces polluting emissions exhausted from gasoline engines.

Eccleston and Fleming reported on hydrogen/natural gas engine tests conducted under the U.S. Bureau of Mines Automotive Exhaust Emissions Program, Technical Progress Report 48, February, 1972. They were really proposing the use of hydrogen-rich synthetic coal gas as an automotive fuel, but they had no such fuel, so, for study purposes only, they simulated the coal gas by preparing mixtures of hydrogen in natural gas. They found that hydrogen reduced hydrocarbon, carbon monoxide, and nitrogen oxide emissions over a wide range of fuel/air mixtures, relative to pure natural gas.

However, the use of hydrogen in conjunction with conventional fuels have also been fraught with difficulties. For example, hydrogen is virtually insoluble in liquid hydrocarbons, such as gasoline or diesel fuel. It also cannot be dissolved in liquefied butane or liquefied propane to any significant extent, although it readily mixes with natural gas in compressed gas tanks. To avoid the necessity of having two fuel storage systems (one for hydrogen, one for the liquid fuel) numerous efforts have sought to break down liquid fuels in on-board reformers to make hydrogen-rich gaseous products. However, even though such processes are routinely carried out in the chemical process industry, they are extremely difficult to implement compactly aboard an automobile in a way that meets the rapid changes in an automobile's fuel demand. Therefore, contemporary alternative fuels programs before this invention have been proceeding without the benefit of clean burning renewable hydrogen.

Because of the fledgling nature of distribution systems for alternative fuels, such as methanol or natural gas, for burning in automobiles, it is advantageous for alternative fuel vehicles to operate on conventional fuels as well. However, the alternative fuels known and used prior to this invention have substantially different burn or combustion rates than the conventional fuels. For example, natural gas, which is considered to be one of the major alternative fuels for at least the near future, and conventional gasoline burn at significantly different rates in internal combustion engines thus requiring substantial engine modifications and adjustments to burn one fuel or the other. At a fixed rotating speed (RPM), manifold vacuum and "equivalence ratio" (the fuel/air ratio as a fraction of the chemically correct or stoichiometric ratio), natural gas burns more slowly than gasoline in a given engine. A number of factors influence the rate of combustion in the cylinder of an engine, but optimum ignition timing should be set where it ignites the fuel soon enough so that the peak combustion pressure occurs about 10° to 15° of crank rotation after the piston passes top-dead-center on the combustion stroke. Because natural gas burns more slowly than conventional gasoline, vehicles with dual fuel engine systems for burning either natural gas or gasoline must have at least some means for advancing the ignition timing to meet the requirements of natural gas and for retarding the timing for optimum gasoline combustion. This requirement presents several technical difficulties, including the need for sophisticated engine control systems that adjust the fuel/air mixture and ignition timing according to the requirements of both the alternative and conventional fuels. Some existing state of the art computerized gasoline engine control systems, when operating in the "closed loop" mode, automatically advance the ignition timing in search of the most efficient operating conditions. If the automatic controls have enough range, they might meet the spark advance requirements of natural gas operation, at least some of the time. At other times, in the "open loop" mode, the ignition timing may be set by the microprocessor to predetermined values that are approximately correct for gasoline under a given set of operating conditions. At such times the spark delivery will be too late for efficient, low emissions operation on natural gas.

There is an aftermarket device called Dual Curve Ignitions offered by Autotronic Controls Corporation, El Paso, Tex., that changes the ignition timing of the engine when it is switched from gasoline to natural gas and back again. However, since there are so many different types of ignition systems in the myriad of different automobiles that may be converted to natural gas in the future, it is impossible for a single device to serve all of them with optimum ignition timing for both gasoline and natural gas. Ford Motor Company is also developing an advanced control system for its "Flexible Fuel Vehicle" that measures the ratio of methanol/gasoline flowing to the engine, computes the correct fuel/air mixture and ignition timing (vastly different for the two fuels), and instructs the engine's electronic controls to make the necessary adjustments. Such sophistication is cost-effective only on a mass-produced basis. Even then, there are so many other engine design features built into the permanent structures of engines by manufacturers based on optimum performance criteria at a conventional fuel burn rate and which cannot be changed, that simple adjustment of fuel-air ratios and spark timing still do not result in efficient running engines when the alternate fuel is burned.

Alternative fuels for diesel or compression ignition engines are also of interest for reducing urban air pollution and dependence on petroleum. In addition to modified petroleum oils, vegetable oils and other liquids are being evaluated for their potential to reduce diesel exhaust emissions. Natural gas is also used in diesel engines by a process known as fumigation wherein gaseous fuel is metered into the intake air stream. However, natural gas does not ignite efficiently by compression. Therefore, when operating on natural gas, a small amount of diesel fuel still is injected into the combustion chamber to ignite the natural gas/air mixture, i.e., acting in lieu of spark plugs. Burning other fuels, such as methanol or natural gas in conjunction with diesel fuel, has been shown to decrease particulate emissions (smoke) and nitrogen oxides, but it also increases harmful carbon monoxide and organic gases.

Hydrogen has also been tried as a supplement to diesel fuel. For example, in the 1920's and 1930's engines of hydrogen filled dirigible air ships burned some hydrogen with diesel fuel. In flight, the loss in weight due to diesel fuel consumption had to be countered by releasing hydrogen to maintain neutral buoyancy. Rather than simply venting the hydrogen to the atmosphere, it was fumigated into the engines, which had the effect of extending the range of the airships. Laboratory studies of hydrogen in diesels have continued to the present, but prior to this invention there have been no real positive or promising hydrogen fumigant or natural gas fumigant techniques for diesel engines that would be both economical as well as provide significantly improved exhaust emission.

SUMMARY OF THE INVENTION

Accordingly, a general object of the present invention is to provide an inexpensive clean burning alternative fuel that can be substituted for, and burned interchangeably with, conventional gasoline or other fuels in spark ignition internal combustion engines.

Another general object of this invention is to provide an inexpensive, clean burning alternative fuel that can substantially decrease the amount of conventional fuel, such as diesel fuel, consumed by a compression ignition engine.

Another general object of this invention is to provide an inexpensive alternative fuel that can be burned in conjunction with diesel fuel in compression ignition engines.

Another general object of this invention is to provide gaseous fuel mixtures that reduce the environmentally harmful exhaust emissions of internal combustion engines.

Another general object of this invention is to provide gaseous fuel mixtures that increase the thermal efficiency of internal combustion engines.

A more specific object of this invention is to provide a gaseous fuel mixture that essentially matches the burning rates of conventional fuels, such as gasoline, in spark-ignition internal combustion engines.

Another specific object of this invention is to provide a gaseous fuel mixture which significantly reduces the emissions of hydrocarbons, relative to pure natural gas, when burned at near-stoichiometric conditions in spark-ignition engines.

Another specific object of this invention is to provide a gaseous fuel mixture that increases the knock-limited power levels attainable in compression ignition (diesel) engines fumigated by gaseous fuels while minimizing the rate of diesel fuel injection at engine loads below the knock-limited power level.

Another specific object of this invention is to provide a gaseous fuel mixture that increases the thermal efficiency of compression ignition (diesel) engines fumigated by gaseous fuels.

Another specific object of the present invention is to provide a gaseous fuel mixture that decreases the exhaust emissions of compression ignition (diesel) engines fumigated by gaseous fuels.

Additional objects, advantages, and novel features of this invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects, and in accordance with the purposes of the present invention, as embodied and broadly described herein, the process of this invention may comprise the steps of mixing natural gas and hydrogen as an alternate fuel in respective proportions that result in the alternate fuel having a combustion rate that matches or nearly approximates the combustion rate of a conventional liquid hydrocarbon fuel, such as gasoline. Such an alternate fuel with a molar percent of hydrogen in the range of about 10 to 20 percent, and preferably about 15 percent, provides a combustion rate similar to gasoline for burning in conventional, spark-ignited gasoline burning engines.

The method and composition of this invention also includes an alternate fuel mixture comprising natural gas and hydrogen for use in fumigating compression-ignited engines, such as diesel engines. This alternate fuel for fumigating diesel engines according to this invention comprises a molar percent of hydrogen in the range of about 5 to 15 percent, and preferably about 10 percent. The method also includes feeding this alternate fuel mixture into the engine as the primary energy source to meet engine load and power demands, while maintaining minimal diesel fuel injection only in sufficient quantities for efficient compression induced ignition. However, use of this alternate fuel as the primary energy source according to this invention is limited to the knock-limited value, and additional energy for power beyond the knock-limited value is provided by injecting additional quantities of liquid diesel fuel.

BRIEF DESCRIPTION OF THE DRAWINGS

The accompanying drawings, which are incorporated herein and form a part of the specification, illustrate preferred embodiments of the present invention and, together with the description, serve to explain the principles of the invention. In the drawings.

DETAILED DESCRIPTION OF THE PREFERRED EMBODIMENTS

Alternative fuels for internal combustion engines are provided, according to the preferred embodiments of this invention, by mixing hydrogen with natural gas. The alternative fuels prepared according to this invention are called "Hythane" for convenience. The prefix Hy is taken from hydrogen, and the suffix thane is taken from methane, which is the principal constituent of natural gas. Also, while the natural gas constituent of this invention is referred to most often as natural gas, methane is understood to be essentially a functional equivalent of natural gas and could be substituted for natural gas in this invention.

The two gaseous fuels, natural gas and hydrogen are mixed in proportions according to this invention that meet two specific objectives, depending on whether the fuel mixture is to be used in a spark-ignited engine or in a compression-ignited engine.

First, for spark-ignited engines, a blend of hydrogen and natural gas is provided that closely approximates the combustion rate of gasoline or other conventional fuel when burned in typical spark-ignition internal combustion engines at a near-stoichiometric fuel/air ratio. This blend, generally referred to as "Hythane G" in this description, permits the mixture to be burned according to this invention efficiently and cleanly as an alternate fuel in engines designed for conventional fuels, such as gasoline, without the need for expensive and complex ignition system and other engine modifications.

Second, for compression-ignited engines, a blend of hydrogen in natural gas, called Hythane D herein, contains the least amount of hydrogen necessary to achieve three beneficial effects: (a) substantial extension of the knock-limited torque levels achievable by fumigation with pure natural gas; (b) increased thermal efficiency that offsets the cost of the hydrogen additive; and (c) substantial reduction in the emission of hydrocarbons from the engine's exhaust.

Since hydrogen and natural gas are completely miscible in one another and chemically nonreactive toward one another, mixtures of the two, once made, can be handled, stored, and fed into internal combustion engines as a homogeneous gas, rather than requiring two separate systems, as are necessary to gain the benefits of using hydrogen with liquid fuels. The simplest way to prepare a Hythane alternative fuel according to this invention is to charge an empty pressure vessel first with one gas (e.g., hydrogen) to a predetermined partial pressure and then continue charging to a predetermined total pressure with the other gas (e.g., natural gas). The two gases mix together rapidly by diffusion and convection as the second gas enters the pressure vessel. Once the two gases are mixed they will remain mixed indefinitely.

Figure 1:
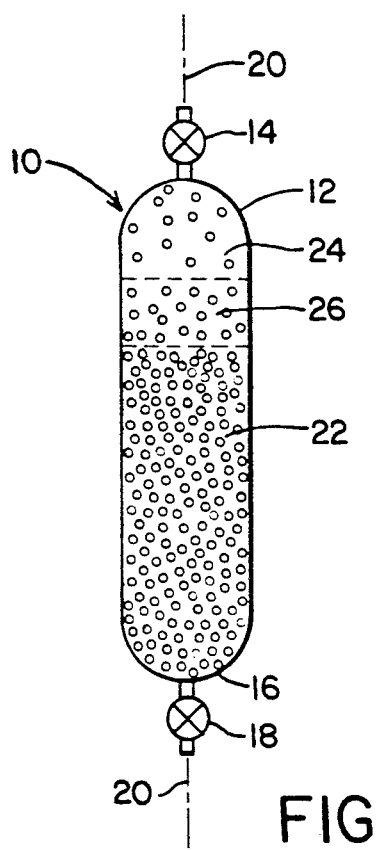
FIG. 1 depicts a compressed gas cylinder containing hydrogen and natural gas in stratified layers, a condition to be avoided when producing the alternative fuels according to this invention.

However, in the preparation of Hythane mixtures, care must be taken to avoid stratification in storage containers. The specific gravity of hydrogen is nearly an order of magnitude less than that of natural gas, so it is possible for stratification to exist for a limited time in a storage cylinder, as illustrated in FIG. 1. A pressurized tank or long, slender compressed gas cylinder 10 is oriented with its longitudinal axis 20 vertical. An upper valve 14 is attached at the top end 12 of cylinder 10 and a lower valve 18 is attached at the lower end 16. These valves 14, and 18 are used for adding and removing gas from tank 10. If tank 10 is partially filled with relatively dense natural gas 22, and if less dense hydrogen 24 is added slowly (i.e., no convective mixing) through the upper valve 14, the contents of the tank will not mix immediately. In the absence of any convective phenomena, the stratified layers of gas will mix together by diffusion, shown generally as region 26, over a period of time that is dependent on tank geometry and gas temperature.

Figure 2:
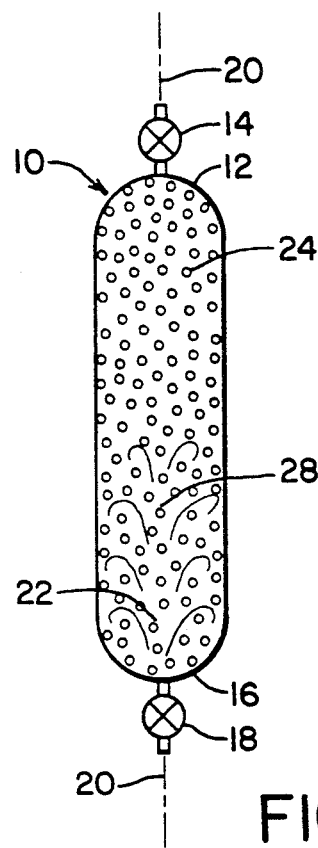
FIG. 2 depicts a compress gas cylinder containing hydrogen and natural gas convectively mixing for producing the alternative fuels according to this invention; and, FIG. 3 is a graphical comparison of the Brake-Specific Fuel Consumption versus Road Horsepower for a semi tractor powered by a Caterpillar 3406B turbocharged, intercooled, compression ignition engine using, alternately, pure #2 diesel fuel, diesel fuel for ignition purposes only with fumigated natural gas, diesel fuel for ignition purposes only with a fumigated mixture called "Hythane D", according to the present invention.

Such stratification can, however, be virtually eliminated, as seen in FIG. 2, by adding hydrogen rapidly (to promote convective stirring) through the lower valve 18 so that any concentrated clouds of low density hydrogen 22 must rise through the denser natural gas 24 and thereby become convectively mixed as shown generally by region 28. If, on the other hand, hydrogen is charged into tank 10 first, it is preferable to charge the natural gas through the upper valve 14.

Under typical vehicle refueling circumstances, when hydrogen and natural gas are rapidly charged into a small horizontal storage cylinder (not shown), mixing is complete, for all practical purposes, within 10 minutes or less. Another way to prepare well-mixed Hythane is to simultaneously flow hydrogen and natural gas into a storage cylinder through a common gas fitting (not shown). Cylinders for the storage of compressed Hythane should conform to the recommendations of National Fire Protection Association Regulation #50A "Gaseous Hydrogen Systems at Consumer Sites".

The composition ratio, in terms of molar percent of the constituents, can be determined conveniently in two ways. If hydrogen and natural gas are stored in pressure vessels of known volume, the molar percent of the mixture can be determined by noting the pressure and temperature changes during the mixing process in the cylinders. By knowing the pressure, temperature, and volume of a gas, it is possible to calculate the mass and hence the number of moles transferred. The equation of state for hydrogen has been determined by the National Institute for Standards and Technology. Technical Note 617 contains all of the information needed to calculate hydrogen masses from pressure-temperature-volume data. Alternatively, Technical Note 617 contains tables of hydrogen densities over a large range of pressures and temperatures. By interpolation, very precise mass determinations may be made without resorting to lengthy computations. Likewise, the American Gas Association has documents available on request which set forth methods of calculating natural gas densities. It is critical for determining molar concentration in this way that the temperatures of the gas storage containers are stable throughout at the time of pressure measurement.

Alternatively, mass flow controllers, such as those available from MKS Instruments, Andover, Mass., Porter Instruments, Hatfield, Pa., Sierra Instruments, Carmel Valley, Calif., or Unit Instruments, Orange, Calif., can be used in tandem to produce any desired gas mixture. By attaching a pair of such controllers at the inlet of a gas compressor, hydrogen and natural gas can be fed in a precise ratio and thoroughly mixed during the compression process prior to entering compressed gas storage cylinders.

Most of the components required to convert motor vehicles for use of Hythane blends are the same as natural gas vehicle components. Compressed gas storage cylinders, pressure regulators, carburetors and miscellaneous equipment for using gaseous fuels in spark ignition engines are commercially available. Impco, Cerritos, Calif. and Automotive Natural Gas Inc., Milton, Wis., offer conversion kits. Compressed gas cylinders suitable for Hythane are available from any manufacturer of mild steel high pressure tanks, such as those used in the merchant gas industry. High performance, lightweight tanks employing composite materials technology are available form Structural Composites, Pomona, Calif. and CNG Cylinder corp., Long Beach, Calif. Aluminum alloys, austenitic stainless steels (e.g., 316) or mild steels (e.g., 1019) are acceptable for containing Hythane at moderate temperatures. Due to the possibility of hydrogen embrittlement, cylinders and other components that carry Hythane should not be made of high strength steels (e.g., 4130) or titanium. Most suppliers of tubing, valves, fittings, regulators and compressed gas cylinders, etc., can supply hydrogen compatibility data for their products. The recommendations of National Fire Protection Association Regulation #52 "Compressed Natural Gas (CNG) Vehicular Fuel Systems" should be followed in modifying vehicles to use Hythane.

The preferred compositions of Hythanes G and D are listed in Table I below. The exact composition of natural gas varies significantly throughout the U.S. so adjustment of the hydrogen content of Hythanes G and D may be necessary to compensate for these variations. The methods used to determine these compositions are delineated in the following examples. Concentrations are expressed in mole percent, which is roughly the same as percent by volume.

TABLE 1

Typical composition of natural gas, pure hydrogen and two Hythane blends.
Typical Composition in Molar Percent

|  | $H_2$ | $N_2$ | $CO_2$ | He | $CH_4$ | $C_2H_6$ | $C_3H_8$ | $C_4H_{10}$ | $C_5H_{12}$ | $C_6H_{14}$ & Heavier |
|---|---|---|---|---|---|---|---|---|---|---|
| Natural Gas | 0 | 2.45 | 0.98 | 0.06 | 92.32 | 3.29 | 0.57 | 0.18 | 0.07 | 0.08 |
| Hydrogen | 100 | — | — | — | — | — | — | — | — | — |
| Hythane D | 10 ± 5 | 2.21 | 0.88 | 0.05 | 83.09 | 2.96 | 0.51 | 0.16 | 0.06 | 0.07 |
| Hythane G | 15 ± 5 | 2.08 | 0.83 | 0.05 | 78.47 | 2.80 | 0.48 | 0.15 | 0.06 | 0.07 |

DESCRIPTION OF FIRST PREFERRED EMBODIMENT—HYTHANE G

An investigation of Hythane G for the purpose described above was conducted with a Mitsubishi 2.6 liter, 4-cylinder, turbocharged, intercooled spark ignition engine in a Dodge Colt pickup truck on a chassis dynamometer. The objective was to learn how much hydrogen was necessary to match the combustion rate of a Hythane blend to that of gasoline. Internal combustion processes are very complex and involve an ignition delay period after the delivery of a spark, during which there is no perceptible pressure rise. Pressure then builds toward a peak value at a rate that is influenced by the properties of the fuel, the fuel/air ratio, temperature, combustion chamber geometry, turbulence, swirl and other parameters.

A practical measure of overall combustion rate, for the purposes of the present invention, is provided by noting the spark advance setting that produces the maximum torque under a fixed set of operating conditions. There is typically a range of spark advance settings over which an engine produces maximum torque. A gradual loss of torque occurs as the spark advance settings are varied outside this range. The least spark advance that will produce maximum engine torque is known to those skilled in engine testing as "minimum best torque" or MBT ignition timing. In test engines equipped with transducers for cylinder pressure and crank angle, maximum torque typically coincides with combustion pressure peaks located about 10° to 15° after top-center on the power stroke. For typical 4-stroke gasoline engines, the requisite spark advance is generally in the range of 10° to 40° before top-center on the compression stroke, depending on a number of aspects of engine design, fuel/air ratio, exhaust gas recycle (if any) and operating conditions. Natural gas, when burned in engines designed for gasoline under comparable conditions, requires significantly greater spark advance to compensate for its slower burning rate. All other conditions being equal, MBT spark timing for efficient combustion of natural gas must be about 15° to 25° more advanced than the standard gasoline ignition timing. Hydrogen, on the other hand, burns much faster than gasoline. In engines specially modified for burning hydrogen at or near the stoichiometric fuel/air ratio, MBT spark timing is found at or after top-center on the power stroke. Since natural gas burns slower than gasoline and hydrogen burns faster than gasoline, the present invention comprises a mixture of the two fuel gases that burns at essentially the same rate as gasoline.

EXAMPLE 1

Tanks containing 10%, 15%, 20%, 25%, and 30% hydrogen by volume were prepared for the tests. The spark timing was adjusted manually to find the "mean best torque" setting at steady speeds with a fixed throttle position. The air/fuel ratio was adjusted manually to maximize $CO_2$ emissions. This assures that the air/fuel ratio was very near the chemically correct or "stoichiometric" value. Conditions ranging from idle to wide open throttle were applied over a range of engine speeds. The resulting settings were compared to the factory distributor curve of the engine. Relatively few tests were necessary to rule out the 25% and 30% mixtures, which burned much faster than gasoline. A Hythane blend with 15% hydrogen in natural gas was found to require substantially the same timing as that provided by the standard gasoline engine distributor. 10% hydrogen on the average required slightly more advance (5°–7°) than the standard gasoline setting and 20% required slightly less advance (approximately 2°–4°). The differences in the 10% to 20% range were small enough to be negligible for the purposes of this invention. Therefore, Hythane G, according to this preferred embodiment of the invention, comprises about 15±5% hydrogen in natural gas.

Emissions measurements were made at various steady speed and load conditions typical of urban driving. The Bear engine analyzer used for the tests showed total hydrocarbons (THC), carbon monoxide (CO), carbon dioxide ($CO_2$) and oxygen ($O_2$) concentrations in the exhaust. Nitrogen oxide emissions ($NO_x$) were not measured; however, it is generally known that by operating as nearly as possible to the stoichiometric mixture (maximized $CO_2$ concentration) $NO_x$ is at the lowest concentration possible without compromising THC and CO emissions.

When operating on pure natural gas under these conditions, the CO concentrations were negligible (a few hundredths of a percent) but the THC emissions were in the range of 100 to 300 ppm. It is generally recognized that 80% to 90% of the THC emitted by natural gas vehicles is photochemically non-reactive methane. Since methane does not contribute to the formation of ozone in the atmosphere, THC values are reduced by the amount of methane to determine the reactive hydrocarbon (RHC) concentration. For Example, the Colorado Department of Health multiplies THC values by 0.15 to determine RHC during vehicle certification tests, thus estimating that 0.85 of the THC is non reactive methane.

When operating over the same range of speeds and loads on Hythane G, THC concentrations were typically in the range of 10 to 20 ppm. When multiplied by the 0.15 RHC factor, the hydrocarbon emissions with Hythane G are truly negligible. Of course, CO emissions were negligible with Hythane G, typically 0.01%. $NO_x$ emissions, although not measured, may be reduced relative to pure natural gas. It is known that $NO_x$ falls rapidly in spark ignition engines as the excess air in the mixture, indicated by exhaust $O_2$, approaches zero. With pure natural gas in engines designed for gasoline, the minimum oxygen concentration that can be achieved is about 2–3% under conditions typical of urban driving. Below that level, CO and THC begin to climb rapidly. With Hythane G, exhaust $O_2$ levels may be reduced to 0.1–0.3% before CO and HC begin to climb. It is therefore probable that $NO_x$ is reduced with Hythane G relative to pure natural gas.

The emissions data obtained in this example and described above is considered to be general in nature and not possible to compare precisely with Federal standards for exhaust emissions. The Federal test procedure, which is expensive and time consuming, could be performed. However, since quantifying the precise emissions reduction is not crucial to the invention, such tests are not necessary and were not performed for this example. It is sufficient to note that: (1) Natural gas vehicles can meet Federal standards for exhaust emissions; (2) Hythane G, according to this invention, provided significant reductions of hydrocarbons, showed negligible CO, and may have reduced $NO_x$ relative to operation on pure natural gas in simulated urban driving; therefore, (3) in qualitative terms, it is reasonable to expect low emissions with Hythane G in the Federal test procedure.

Although fuel consumption was not measured during this Example 1 testing of Hythane G, reduced fuel consumption is projected, because Hythane G solves a fundamental problem with burning natural gas in engines designed for gasoline. Since it is necessary to ignite natural gas earlier on the compression stroke than gasoline at any particular operating condition, there is a greater expenditure of work performed against the expanding combustion products during the compression stroke. This wasted work is generally recognized by those skilled in the art of converting engines for dual fuel operation, as one of the penalties of burning natural gas in engines designed for gasoline. Designers of dedicated natural gas engines seek to solve this problem or at least minimize it with increased compression ratio and altered combustion chamber design. In contrast, with the Hythane G of this invention burned in an essentially conventional gasoline engine, by definition the pressure rises at a rate very similar to gasoline. Therefore, thermal efficiency is expected to be comparable regardless of whether Hythane G or gasoline is used in a given engine.

DESCRIPTION OF THE SECOND PREFERRED EMBODIMENT—HYTHANE D

The second embodiment alternative fuel of this invention also comprises a blend of natural gas and hydrogen, but it is specially formulated for fumigating or burning in compression ignited or diesel engines rather than for matching the combustion rate of gasoline. The combination of natural gas and hydrogen, according to this invention, has been found to provide significant advantages in fumigating diesel engines that have not been obtained from the use of either natural gas or hydrogen alone with diesel fuel. However, as described below, a different proportionate range of the natural gas and hydrogen constituents is preferred for use in compression ignited diesel engines than for use in spark-ignited gasoline engines.

EXAMPLE 2

Tests were conducted with a Caterpillar 3406B turbocharged, intercooled diesel engine in a Freightliner semitractor at the test facilities of Tren Fuels, Inc., of Denver, Col. The conventional diesel injection system of the engine was set to provide the least quantity of #2 diesel fuel, obtained from Total Petroleum, Inc., that was needed to cause reliable ignition of gaseous fuels, i.e., the diesel injectors acted in lieu of spark plugs. The air intake system of the engine was equipped with a gaseous fuel line, regulators, and manual control valves to facilitate the introduction of gaseous fuels to the flow of air entering the diesel engine—a practice known as fumigation. The gaseous fuel comprising the mixture of natural gas and hydrogen according to this invention entered the air stream before the inlet of the turbocharger, thereby assuring turbulent mixing as the gaseous fuel flowed through the turbocompressor and intercooler. All tests were conducted on a chassis dynamometer at 1300 RPM with the transmission in 8th gear. Essentially, the engine was run primarily on the alternate gaseous fuel fed through the air intake, and the diesel fuel fed through the conventional injectors was only used to ignite from the compression and in turn to ignite the gaseous fuel.

The tests were conducted by gradually increasing the flow of gaseous fuel into the diesel's air stream, which increased the engine's power output to the dynamometer. The power output was increased in this manner to the maximum level that could be sustained without knocking—a condition that has severely damaged fumigated diesel engines in the past. Knocking results when a portion of the fuel/air mixture, usually near the hot exhaust valve, becomes heated and compressed ahead of the advancing flame front. Before the mixture can be consumed smoothly by the normal combustion process (deflagration) it abruptly detonates and sends shock waves through the engine structure that are heard as audible knocking sounds. Knocking can and often does result in overheated engine parts (especially pistons) and physical damage from the shock waves.

Initial tests with 2% and 4% hydrogen by volume in natural gas showed 6-7% increases in knock-limited power. Subsequently, mixtures with 10% and 15% hydrogen were prepared. Table II compares the power levels and emissions that were recorded for pure natural gas and a Hythane D blend containing 10% hydrogen by volume.

TABLE 2

| Fuel | Emissions at knock-limited maximum power with a fumigated diesel engine at 1300 RPM. | | | | |
|---|---|---|---|---|---|
| | MAP PSI* | Power | Emissions | | |
| | | | % CO | ppm HC | % $O_2$ |
| Natural Gas | 7.0 | 178 | 0.25 | 269 | 6.8 |
| Hythane D | 7.5 | 209 | 0.24 | 120 | 5.7 |

MAP PSI = manifold air pressure, pounds per square inch gage

Accounting for the slightly higher manifold air pressure (hence greater volume of exhaust), greater knock-limited power level and lower ppmHC, the brake-specific HC emissions (i.e., grams per kW-hr) with Hythane D according to this invention are estimated to be 61% less than with pure natural gas.

As can be seen from Table 2, hydrogen increased the power level that could be attained without encountering engine knock by 17% over pure natural gas. The detonations that are responsible for knocking require an incubation period, during which precursor reactions take place in the heated and compressed mixture. There are two ways that hydrogen mixed with natural gas may solve the knocking problem. Additives that prevent knocking in gasoline engines do so by inhibiting detonation precursor reactions. The hydrogen may have that effect on natural gas. Another possible explanation is that, since hydrogen accelerates combustion, the entire charge in the combustion chamber is consumed before the incubation period is over. In either case, the effectiveness speaks for itself in the substantial increase in knock-limited power coupled with a substantial decrease in emissions, specifically in hydrocarbons (HC).

Figure 3:
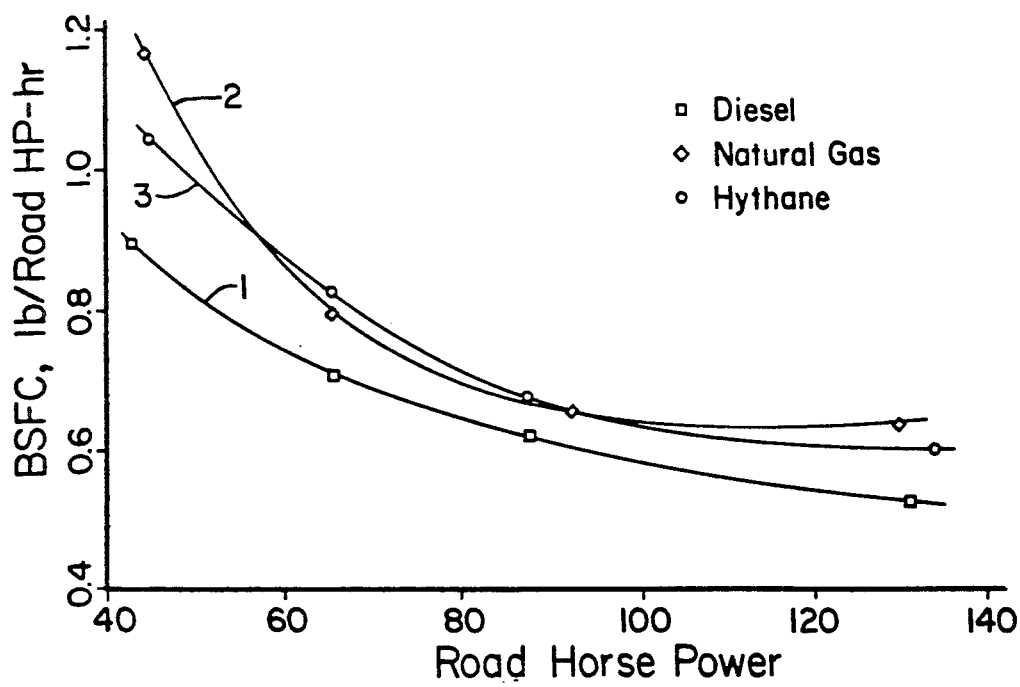

Additional tests indicate that 10±5 % hydrogen in natural gas is enough to make significant improvements in engine efficiency. The curves in FIG. 3 show the brake specific fuel consumption of a diesel engine with three fuel combinations: (1) pure diesel; (2) natural gas with a small amount of diesel for ignition; and (3) Hythane D of this invention with an equally small amount of diesel fuel for ignition purposes. Diesel fuel alone is clearly the most efficient fuel and natural gas the least efficient with Hythane D somewhere between the two. The brake-specific fuel consumption is reported in FIG. 3 in equivalent pounds of diesel fuel per road horsepower-hour. Hydrogen and natural gas consumption were converted to equivalent pounds of diesel fuel by ratios of lower heat value of the fuels, then added to the amount of diesel fuel used for ignition purposes. Road horsepower read from a chassis dynamometer includes losses through the drive train and tires.

The tests that produced FIG. 3 were conducted with 15 mole-percent hydrogen in natural gas. Increasing hydrogen concentration to 20% reduced hydrocarbon emissions further, but it also brought diminishing returns with respect to engine efficiency. Increased fuel cost and reduced fuel capacity of the compressed gas storage tanks is a deterrent to greater hydrogen concentrations, unless future emissions regulations mandate lower emissions.

The preferred method of fumigation with Hythane makes use of the blended fuel's ability to extend torque levels compared to fumigation with pure natural gas. The engine starts and idles on diesel fuel alone. At any speed above idle, the diesel engine controls are set to provide just enough diesel fuel to allow the engine to operate with no load, a condition known as "pilot injection". This amount of diesel fuel is sufficient to produce stable ignition when fumigated fuel/air mixtures enter the engine. As engine load is increased from zero at any given speed, the fumigated fuel/air ratio is increased accordingly, up to the knocklimited value. The knock-limited value will vary from engine to engine, depending on combustion chamber design, charge air temperature and the temperature of the combustion chamber walls, valves, etc. For the particular Caterpillar 3406B-powered tractor used in the Hythane D fumigation tests, the knock-limited power attainable at 1500 RPM (see Table 2) was 209 road horsepower. In tests conducted previously on diesel fuel alone by Wagner Equipment Company, Denver, Colo., the tractor produced 314 road horsepower. Therefore, with Hythane D, 67% of the diesel's power at 1500 rpm can be attained with a minimal flow of diesel fuel. The amount of diesel fuel used during the Hythane D tests was measured with a high precision beam balance and a stop watch. The diesel fuel consumption rate during the Hythane D tests was 23 lbs. per hour. The brake specific diesel fuel consumption (not counting energy supplied by Hythane D) was therefore, 0.11 lb. diesel fuel per road horsepower-hour. The brake specific fuel consumption with pure diesel fuel at the same speed and load was 0.45 lb. diesel per road horsepower-hour. The diesel fuel consumption was thereby reduced to 24% of the usual requirement.

To increase the tractor's power from the knock-limited level of 209 road horsepower to the full rated diesel power level of 324 road horsepower, it was necessary to increase the flow of diesel fuel to 70 lbs. per hour. At the full rated load, the brake specific diesel fuel consumption (not counting energy supplied by Hythane D) was 0.33 lb. diesel/road horsepower-hour. The brake specific fuel consumption of the tractor at full load on diesel fuel alone was 0.41 lb. per road horsepower. Therefore, 80% of the tractor's power was supplied by diesel fuel at the full load condition. It is important to note that a fumigated diesel can produce more than its full rated load and that allowing this to happen, can, and has, damaged engines.

In operating a diesel engine fumigated with Hythane D as described above, the consumption of diesel fuel is minimized, especially in conditions requiring less than 67% of the engine's full power potential. When more power is required, such as when a truck equipped with this Hythane D system on its engine has to pull a load up a hill, full rated engine performance is provided via increased diesel fuel injection which also protects against engine damage from knocking on Hythane D.

Specific devices for accomplishing these objectives may vary from engine to engine owing to the peculiarities of diesel injection controls from various manufacturers.

Hydrogen and natural gas costs for Hythanes are indicated in Table 3 below. The non-Hythane portions of Table 3 represent estimates of fuel prices in 1993 taken from a report entitled "Cost and Availability of Low Emission Motor Vehicles and Fuels", a Calif. Energy Commission Staff Report (Draft) AB 234 Report, Apr. 1989. The unforeseen oil price increases of 1990 serve to strengthen the argument that Hythane blended gaseous fuels may be cost-competitive with conventional petroleum-based fuels. For example, tests that produced FIG. 3 were conducted with 15 mole % hydrogen which is approximately equal to 15 % by volume. One cubic foot of natural gas contains about 1000 Btu, whereas one cubic foot of hydrogen contains only 319 Btu on a "higher heat value" or "gross heat of combustion" basis. Therefore 10 mole percent hydrogen is only 3.2% hydrogen by energy content. Table 3 indicates that the cost of the ingredients to manufacture Hythane D is $0.48 per equivalent gallon of gasoline. The ingredients of Hythane G, 15% by volume or 4.8% by energy content, would cost about $0.50 per equivalent gallon of gasoline. A detailed cost analysis has yet to be performed. However, after adding a reasonable margin for blending, compression, distribution and profit, it appears that Hythanes G and D will be cost-competitive with gasoline and diesel fuel.

TABLE 3

| Fuel | $/gallon (gas equiv.) |
|---|---|
| Gasoline | |
| Wholesale Unleaded | 0.70 |
| Wholesale Premium | 0.77 |
| Natural Gas | |
| Core | 0.54 |
| Non-core | 0.45 |
| Hydrogen | |
| Steam Reform | 1.43 |
| Electrolysis | 5.40 |
| Hythane (% H$_2$ by energy content) | |
| 0% | 0.45 |
| 5% | 0.50 |
| 10% | 0.55 |
| 15% | 0.60 |
| 20% | 0.65 |
| 25% | 0.70 |
| 40% | 0.84 |
| 50% | 0.94 |
| 75% | 1.19 |

References to gasoline and diesel fuel for purposes of describing this invention include those fuels as defined by the American Petroleum Institute. However, this invention is not limited to the use of a mixture of natural gas and hydrogen as replacements for gasoline or in conjunction with diesel fuel, even though those are the most common fuels in use. Therefore, while a primary purpose of this invention is to provide an alternate fuel that matches the combustion rate of gasoline, matching a combustion rate of a different fuel or fuel mixture is considered to be within the scope of and equivalent to this invention. Also, while another primary purpose of this invention is to provide an alternative fuel fumigant for use with compression-ignited engines that are designed for burning diesel fuel, it is equally applicable to use as a fumigant with other compression-ignited fuels, such as, for example, kerosene, vegetable oils, reformulated diesel fuels, coal-derived liquid hydrocarbon fuels, and the like.

Also, the lower alkane fuels as used in reference to this invention include such fuels as natural gas, methane, ethane, butane, propane, or other fuels that are generally delivered to an engine in gaseous form. In fact, it is well-known that natural gas is comprised primarily of these lower alkanes, the principal one being methane, so that any one or a combination of these lower alkane fuels is considered to be the substantial equivalent of natural gas for purposes of this invention.

The higher alkanes include hexane ($C_6H_{14}$), heptane ($C_7H_{16}$), octane ($C_8H_{18}$), gasoline, diesel fuels, and the like that are normally handled and delivered to an engine in liquid form.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention as defined by the claims which follow.

The embodiment of the invention in which an exclusive property or privilege is claimed are defined as follows:

1. For an internal combustion engine that has at least one compressible combustion chamber, fuel feed apparatus for feeding a combustible first fuel into the compression chamber, and an igniter for igniting fuel in the combustion chamber, wherein said first fuel has a specific burn rate that is higher than methane and lower than hydrogen, and wherein said engine has design criteria, including compression parameters for the combustion chamber and timing of the igniter, that are optimum for the specific burn rate of said first fuel, the improvement in the method of operating said engine, comprising the steps of:

feeding into said combustion chamber an alternate fuel comprising natural gas and hydrogen mixed together in respective proportions that cause said alternate fuel to have an effective burn rate that substantially matches said specific burn rate of said first fuel while maintaining said design criteria substantially the same.

2. The improvement of claim 1, wherein said respective proportions of said alternate fuel have a molar percent hydrogen in the range of about 10 to 20 percent and the remainder of the alternate fuel being natural gas.

3. The improvement of claim 1, wherein said alternate fuel has about fifteen percent (15%) hydrogen and the remainder of the alternate fuel being natural gas.

* * * * *